US012658483B2

(12) United States Patent
Jung et al.

(10) Patent No.: US 12,658,483 B2
(45) Date of Patent: Jun. 16, 2026

(54) BUTTON-TYPE SECONDARY BATTERY

(71) Applicant: LG ENERGY SOLUTION, LTD., Seoul (KR)

(72) Inventors: Yeong Hun Jung, Daejeon (KR); Young Ji Tae, Daejeon (KR); Joo Hwan Sung, Daejeon (KR); Min Su Cho, Daejeon (KR); Geun Young Park, Daejeon (KR); Min Gyu Kim, Daejeon (KR); Min Seon Kim, Daejeon (KR); Sang Hak Chae, Daejeon (KR); Min Young Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 261 days.

(21) Appl. No.: 18/277,202

(22) PCT Filed: Oct. 14, 2022

(86) PCT No.: PCT/KR2022/015657
§ 371 (c)(1),
(2) Date: Aug. 14, 2023

(87) PCT Pub. No.: WO2023/063797
PCT Pub. Date: Apr. 20, 2023

(65) Prior Publication Data
US 2024/0145790 A1 May 2, 2024

(30) Foreign Application Priority Data

Oct. 14, 2021 (KR) ........................ 10-2021-0136974

(51) Int. Cl.
| | |
|---|---|
| *H01M 10/42* | (2006.01) |
| *H01M 10/04* | (2006.01) |
| *H01M 10/658* | (2014.01) |
| *H01M 50/109* | (2021.01) |
| *H01M 50/153* | (2021.01) |
| *H01M 50/186* | (2021.01) |
| *H01M 50/474* | (2021.01) |

(52) U.S. Cl.
CPC ... H01M 10/4235 (2013.01); H01M 10/0431 (2013.01); H01M 10/658 (2015.04);
(Continued)

(58) Field of Classification Search
CPC ......... H01M 10/0422; H01M 10/0427; H01M 50/109; H01M 50/152; H01M 50/153
See application file for complete search history.

(56) References Cited

U.S. PATENT DOCUMENTS

| | | | |
|---|---|---|---|
| 2009/0111025 A1 | 4/2009 | Lee et al. |
| 2011/0123853 A1 | 5/2011 | Kim |

(Continued)

FOREIGN PATENT DOCUMENTS

| | | |
|---|---|---|
| CN | 210379131 U | 4/2020 |
| CN | 111180616 A | 5/2020 |

(Continued)

OTHER PUBLICATIONS

WO-2020036440-A1 Translation from Espacenet (Year: 2020).*
(Continued)

*Primary Examiner* — Nathanael T Zemui
(74) *Attorney, Agent, or Firm* — Morgan, Lewis & Bockius LLP

(57) ABSTRACT

A button-type secondary battery includes a lower can having a bottom surface; an upper can having a top, the upper can and the lower can being coupled to define a space therein; an electrolyte in the space; an electrode assembly in the space and including a negative electrode, a separator, and a positive electrode wound together; a gasket between the upper can and the lower can to electrically insulate the upper and lower cans; a top insulator that is electrically insulating and covering a top surface of the electrode assembly; and a bottom insulator that is electrically insulating and covering a bottom surface of the electrode assembly. The top and
(Continued)

bottom insulators are each configured to expand in volume by absorbing the electrolyte. Surfaces of at least one of the top insulator and the bottom insulator are coated with a protective layer to prevent thermal shrinkage from occurring.

10 Claims, 6 Drawing Sheets

(52) U.S. Cl.
CPC ....... *H01M 50/109* (2021.01); *H01M 50/153* (2021.01); *H01M 50/186* (2021.01); *H01M 50/474* (2021.01)

(56) References Cited

U.S. PATENT DOCUMENTS

| | | |
|---|---|---|
| 2011/0200871 A1 | 8/2011 | Pytlik et al. |
| 2021/0328290 A1 | 10/2021 | Lee et al. |

FOREIGN PATENT DOCUMENTS

| | | | |
|---|---|---|---|
| CN | 112599902 A | 4/2021 | |
| JP | 2010-055987 A | 3/2010 | |
| JP | 2019-016594 A | 1/2019 | |
| KR | 10-0686850 B1 | 2/2007 | |
| KR | 10-2007-0071241 A | 7/2007 | |
| KR | 10-0775310 B1 | 11/2007 | |
| KR | 10-2011-0009097 A | 1/2011 | |
| KR | 10-2011-0057987 A | 6/2011 | |
| KR | 10-2014-0017743 A | 2/2014 | |
| KR | 10-2020-0020619 A | 2/2020 | |
| KR | 10-2020-0142451 A | 12/2020 | |
| KR | 10-2021-0006245 A | 1/2021 | |
| KR | 10-2021-0114863 A | 9/2021 | |
| WO | WO-2020036440 A1 * | 2/2020 | .......... H01M 50/186 |

OTHER PUBLICATIONS

International Search Report (with partial translation) and Written Opinion dated Jan. 16, 2023, for corresponding International Patent Application No. PCT/KR2022/015657.

* cited by examiner

BUTTON-TYPE SECONDARY BATTERY

CROSS-REFERENCE TO RELATED APPLICATION

The present application claims the benefit of the priority of Korean Patent Application No. 10-2021-0136974, filed on Oct. 14, 2021, which is hereby incorporated by reference in its entirety.

TECHNICAL FIELD

The present invention relates to a button-type secondary battery having a shape of which a diameter is greater than a height, and more particularly, to a button-type secondary battery in which a top insulator and a bottom insulator absorb an electrolyte so as to be expanded, thereby reducing an impact and vibration which are transferred to an electrode assembly and preventing short circuit due to an impact from progressing to fire or explosion.

BACKGROUND ART

A button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like a cylindrical or pouch-type secondary battery.

A button-type battery case generally employs a welding coupling method in which a top plate is welded to a top surface of a lower can or a press-fit method in which an upper can is press-fitted into a lower can.

In general, the welding coupling method has a structure in which the lower can and the top plate are coupled to each other by welding. Here, the lower can has a schale shape, and the top plate is manufactured in a disk shape that is capable of being seated on the lower can so that an edge portion is coupled by seam welding in a state of being seated on the lower can.

Here, a positive terminal connected to a positive electrode tab is coupled to the top plate, and the positive terminal and the top plate are insulated from each other by a gasket. The positive terminal may be coupled to the top plate in a rivet method, in which upper and lower ends of the positive electrode terminal are expanded in diameter when passing through the top plate, or a thermal fusion method, in which a gasket is thermally fused in a state in which a portion of a positive electrode terminal passes through a top plate to fix the top plate and the positive electrode terminal to each other.

And, as illustrated in FIG. 1, in the press-fitting method, an upper can 30 is pressed to be fitted into the lower can 20 so as to be coupling to each other. In the press-fitting method, an upper can 30 and a lower can 20 are manufactured in a schale shape (flat cylindrical shape with a diameter greater than height). Here, the upper can 30 has a diameter that is slightly greater than that of the lower can 20. After the negative electrode tab 12 and the positive electrode tab 11 are welded to the lower can 20 and the upper can 30, respectively, in a state in which an electrode assembly 10 is mounted on the lower can 20, when an electrolyte is injected into the lower can 20, the upper can is press-fitted and coupled onto the lower can 20. Here, a gasket 40 is inserted between an upper sidewall 32 of the upper can 30 and a lower sidewall 22 of the lower can 20, which face each other, to electrically insulate the upper can 30 and the lower can 20 from each other.

In addition, the electrode assembly 10 is put into and wound on a rotating core in order of a separator, a negative electrode, a separator, and a positive electrode (or other predetermined orders) and has a flat cylindrical structure in which a center hole 10a is formed when the core is separated.

In addition, in the electrode assembly 10, a negative electrode tab 12 extending from the negative electrode and a positive electrode tab 11 extending from the positive electrode protrude from top and bottom surfaces, respectively. Also, the negative electrode tab 12 is bonded to a bottom surface 21 of the lower can 20, and the positive electrode tab 11 is bonded to a top surface 31 of the upper can 30 or a positive electrode terminal according to the above-described coupling method.

Thus, the lower can 20 has a negative polarity, and the upper can 30 has a positive polarity. Here, since the electrode assembly 10 is in a state in which the positive electrode, the separator, and the negative electrode are wound, a top insulator 1 and a bottom insulator 2, which are made of insulating materials, are respectively stacked or attached on top and bottom surfaces of the electrode assembly 10 to prevent the negative electrode provided in the electrode assembly 10 from being in contact with the upper can 30 and prevent the positive electrode provided in the electrode assembly from being in contact with the lower can 20.

Regardless of the press-fitting method or the welding method, the electrode assembly 10 is embedded in the lower can 20 described above. In addition, when an external impact or vibration is applied, there is a problem in that the impact or vibration is directly transmitted to the electrode assembly 10, or the electrode assembly 10 is damaged or deformed due to crushing of each of the lower can 20 and the upper can 30.

Particularly, since the positive electrode tab 11 and the negative electrode tab 12 may be bent during the welding, if the electrode assembly 10 is continuously shaken by the impact and vibration, there is a problem in that the positive electrode tab 11 or the negative electrode tab 12 is disconnected.

In addition, when the core is removed after the electrode assembly 10 is manufactured, there is a problem in that possibility of deformation due to the impact and vibration in the vicinity of the center hole 2 of the electrode assembly 10 further increases.

DISCLOSURE OF THE INVENTION

Technical Problem

Therefore, a main object of the present invention is to provide a button-type secondary battery, which has a structure that is more robust to an external impact and is capable of buffering an impact transmitted to an electrode assembly (by filling an inner space between an upper can and a top insulator and between a bottom insulator and a lower can).

In addition, another object of the present invention is to provide a button-type secondary battery in which a protective layer is applied on a surface of each of a top insulator and a bottom insulator to prevent thermal shrinkage from occurring, thereby preventing fire or explosion from occurring.

Technical Solution

The present for achieving the above object provides a button-type secondary battery, in which, when an electrode assembly is mounted on a lower can, on which an upper sidewall is formed upward along a circumference of a flat bottom surface, and an electrolyte is injected, an upper can, on which a lower sidewall is formed downward along a circumference of a flat top surface, is press-fitted and coupled so that the upper sidewall is disposed inside the lower sidewall, the button-type secondary battery including: an electrode assembly which is manufactured by winding a negative electrode, a separator, a positive electrode and in which a negative electrode tab extends downward, and a positive electrode tab extends upward; a gasket disposed between the upper can and the lower can to insulate electricity; a top insulator which is disposed to cover a top surface of the electrode assembly, has electrical insulation, and is expanded in volume by absorbing the electrolyte; and a bottom insulator which is disposed to cover a bottom surface of the electrode assembly, has electrical insulation, and is expanded in volume by absorbing the electrolyte, wherein surfaces of at least one or more of the top insulator and the bottom insulator are coated with a protective layer configured to prevent thermal shrinkage from occurring.

The protective layer configured to prevent the thermal shrinkage from occurring may be applied to all of a surface of the top insulator, which faces the upper can, and a surface of the bottom insulator, which faces the lower can.

The protective layer configured to prevent the thermal shrinkage from occurring may be additionally applied to a surface opposite to the surface of the top insulator, which faces the upper can, and a surface opposite to the surface of the bottom insulator, which face the lower can.

The top insulator may be configured to cover an entire top surface of the electrode assembly, and the bottom insulator may be provided in a plate shape having a size that is enough to cover an entire bottom surface of the electrode assembly.

The protective layer may include inorganic particles configured to provide heat resistance to the protective layer. The protective layer may be manufactured by mixing the inorganic particles and a binder polymer that provides bonding force to adhere to the surface of the top insulator or the bottom insulator.

When the top insulator and the bottom insulator absorb the electrolyte so as to be expanded, each of the top insulator and the bottom insulator may be expanded to elastically press the electrode assembly vertically downward from an upper side.

One of the top insulator and the bottom surface may be further expanded vertically than the other one.

A specific portion of the top insulator or the bottom insulator may be coated with the protective layer to have a thickness greater than that of each of other portions.

Furthermore, the present invention may additionally provide the secondary battery module in which the plurality of button-type secondary batteries having the above characteristics are electrically connected to each other.

Advantageous Effects

According to the present invention having the above-described technical characteristics, since the bottom insulator and the top insulator are expanded to fill the spaces inside the upper and the lower can, the external impact transmitted to the electrode assembly may be buffered, and the effect due to the vibration may be reduced.

Therefore, the electrode assembly may be prevented from being damaged, and the durability of the secondary battery may be further improved.

In addition, the degree of deformation of each of the upper and lower cans may be reduced.

Since the bottom insulator and the top insulator are expanded in the state of being mounted on the electrode assembly, there is no need to increase in height of the lower can, thereby preventing the volume from unnecessarily increasing.

The protective layer for preventing the thermal shrinkage may be applied on the top surface or both the surfaces of the top insulator to prevent the thermal shrinkage of the top insulator and/or the bottom insulator due to the heat generated during the short circuit.

Therefore, the problem of the fire or explosion due to the increase in short-circuit current (due to the increase in the contact area between the upper can and the negative electrode or between the lower can and the positive electrode) may be solved.

MODE FOR CARRYING OUT THE INVENTION

Figure 1:
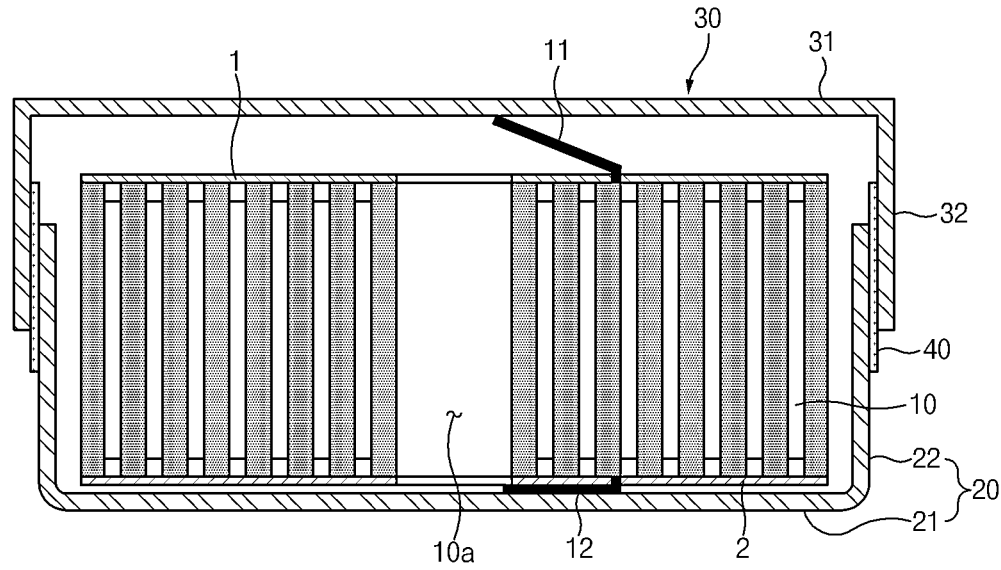
FIG. 1 is a longitudinal cross-sectional view of a button-type secondary battery according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a button-type secondary battery having a larger diameter than a height, and is characterized by having a structure, in which an electrode assembly 10 is protected from an external impact, and even if short circuit occurs, fire or explosion does not occur. Hereinafter, embodiments according to the present invention will be described with reference to the accompanying drawings.

Figure 2:
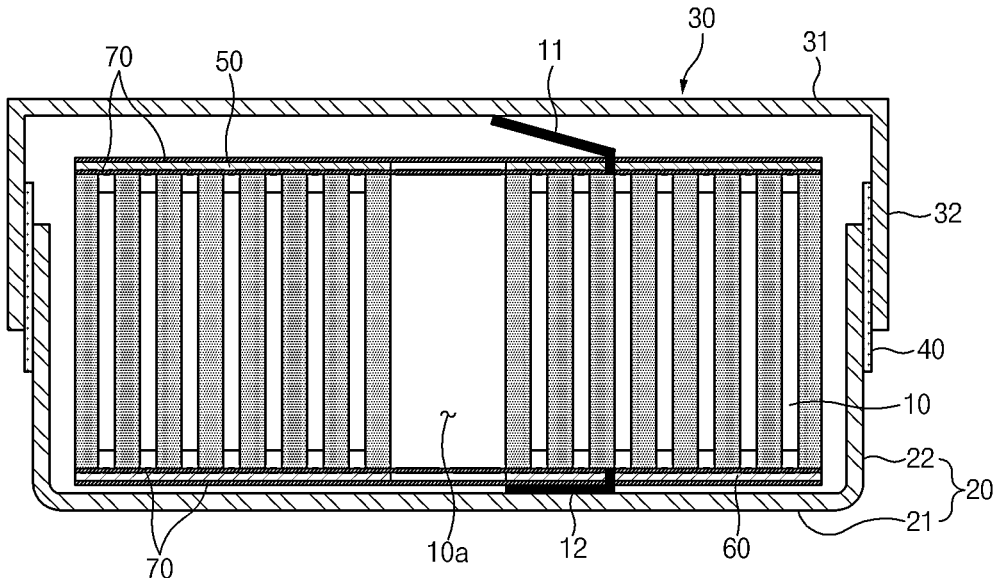
FIG. 2 is a longitudinal cross-sectional view of a button-type secondary battery according to the present invention, which illustrates a state in which a protective layer is applied on a surface of each of a top insulator and a bottom insulator.
Figure 3:
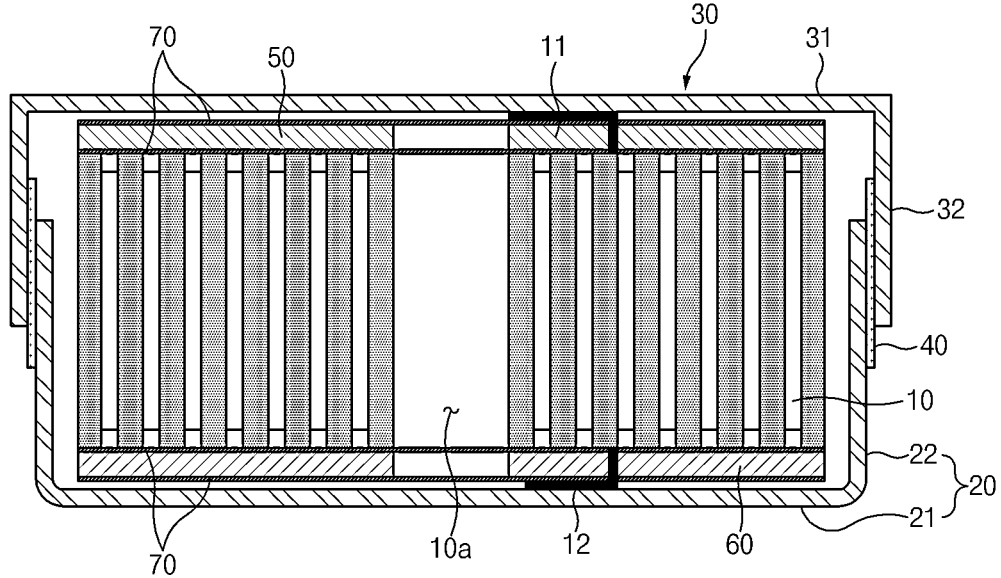
FIG. 3 is a view illustrating a state in which the top insulator and the bottom insulator, which are illustrated in FIG. 2, are expanded by absorbing an insulator.
Figure 4:
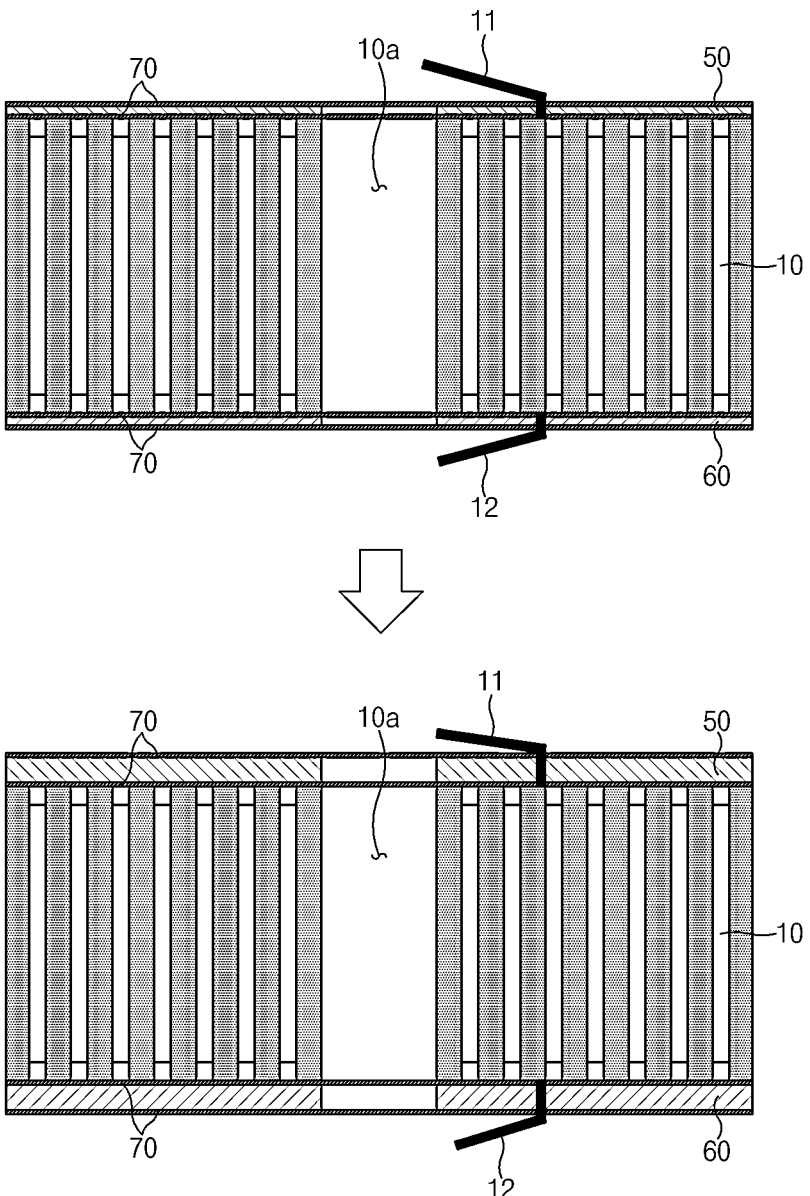
FIG. 4 is a view of an electrode assembly according to the present invention, which illustrates a stage before (upper drawing) and after (lower drawing) the top insulator and the bottom insulator are expanded.

FIG. 2 is a longitudinal cross-sectional view of a button-type secondary battery according to the present invention, which illustrates a state in which a protective layer is applied on a surface of each of a top insulator 50 and a bottom insulator 60, FIG. 3 is a view illustrating a state in which the top insulator 50 and the bottom insulator 60, which are illustrated in FIG. 2, are expanded by absorbing an insulator, and FIG. 4 is a view of an electrode assembly according to the present invention, which illustrates a stage before (upper drawing) and after (lower drawing) the top insulator 50 and the bottom insulator 60 are expanded.

Like the structure according to the related art, a button-type secondary battery provided in the embodiment of the present invention has a structure, in which an upper can 30 is press-fitted to be coupled to a lower can 20 when the electrode assembly 10 is mounted on the lower can 20, and an electrolyte is injected, and includes the electrode assembly 10, the lower can 20, the upper can 30, a gasket 40, a top insulator 50, and a bottom insulator 60.

The electrode assembly 10 has a structure, in which a separator, a negative electrode, a separator, and a positive electrode are put in and wound around a rotating core in order (or in another order) so that the separator, the negative electrode, the separator, and the positive electrode are wound in a laminated state, and when the core is separated after rotating, a center hole 10a is formed therein.

In addition, a negative electrode tab 12 extending from the negative electrode protrudes from a bottom surface of the electrode assembly 10, and a positive electrode tab 11 extending from the positive electrode protrudes from a top surface of the electrode assembly 10. That is, the electrode assembly 10 is inserted into the lower can 20 (in some cases, may be inserted in an opposite direction) so that the negative electrode tab 12 is placed at a lower side, and the positive electrode tab 11 is placed at an upper side.

The lower can 20 is formed so that an upper sidewall 22 extends vertically upward along a circumference of a bottom surface 21 thereof, and the electrode assembly 20 is mounted into an inner space thereof, and then, an electrolyte is injected. In addition, the negative electrode tab 12 is welded to the bottom surface 21. The negative electrode tab 12 may be welded by irradiating welding laser into a center hole 10a or welded by entering a welding machine into the center hole 10a.

As the negative electrode tab 12 is welded to the lower can 20, the lower can 20 may have a negative polarity. Therefore, in order to prevent the lower can 20 and the positive electrode wound in the electrode assembly 10 from being in contact with each other, the electrode assembly 10 is mounted on the lower can 20 in a state in which a bottom insulator 60 having electrical insulation is stacked (attached) on the bottom surface of the electrode assembly 10.

In addition, the upper can 30 is formed so that a lower sidewall 32 extends vertically downward along a circumference of a top surface 31, and the positive electrode tab 11 extending from the electrode assembly 10 is welded to the top surface 31 of the upper can 30 before the upper can 30 is press-fitted into the lower can 20.

In addition, for the same reason, in order to prevent the upper can 30 connected to the positive electrode tab 11 and the negative electrode wound inside the electrode 10 from being in contact with each other, the top insulator 50 having electrical insulation is stacked (attached) on the top surface of the electrode assembly 10.

After the positive electrode tab 11 and the negative electrode tab 12 are welded to each other, in a state in which a gasket 40 is fixedly attached either inside the lower sidewall 32 of the upper can 30 or outside the upper sidewall 22 of the lower can 20, the press-fitting between the upper can 30 and the lower can 20 is performed.

As illustrated in FIGS. 3 and 4, when an electrolyte (not shown) is injected into the lower can 20 in the state in which the top insulator 50 and the bottom insulator 60 are stacked on the electrode assembly 10, the top insulator 50 and the bottom insulator 60 absorb the electrolyte to increase in volume. Thus, spaces inside each of the lower can 20 and the upper can 30 are filled by the increase in volume of the expanded top insulator 50 and bottom insulator 60, respectively.

Here, the top insulator 50 may cover the entire top surface of the electrode assembly, and the bottom insulator 60 may be provided in a disk shape having a size capable of covering the entire bottom surface of the electrode assembly.

In addition, when the top insulator 50 and the bottom insulator 60 absorb the electrolyte so as to be expanded, the electrode assembly 10 may be expanded to the extent that the top insulator 50 and the bottom insulator 60 are capable of elastically pressing the electrode assembly 10 upward and downward from upper and lower sides.

One of the top insulator 50 and the bottom insulator 60 may be configured to be more expanded vertically than the other one according to a height of the electrode assembly 10 and a height of the sidewall 22. For example, since a space between the electrode assembly 10 and the top surface 31 of the upper can 30 is larger than a space between the electrode assembly 10 and the bottom surface 21 of the lower can 20, if the top insulator 50 is expanded more than the bottom insulator 60, the inner space may be efficiently filled. Alternatively, a converse configuration is also possible.

Particularly, in the present invention, at least one of the top insulator 50 or the bottom insulator 60, preferably both the top insulator 50 and the bottom insulator 60 are coated with a protective layer that prevents thermal shrinkage from occurring.

That is, the present invention provides a button-type secondary battery, in which the protective layer is applied on surfaces of the top insulator 50 and the bottom insulator 60 as another embodiment.

As described above, the protective layer 70 may be applied not only on the surface facing the top surface 31 of the upper can 30 but also on an opposite surface thereof. In addition, the protective layer 70 may be applied to one or all of both the surfaces of the bottom insulator 60.

However, if the protective layer 70 is applied on only one surface of each of the top insulator 50 and the bottom insulator 60 for reasons of production cost and process, the protective layer 70 is applied to a surface opposite to the surface facing the electrode assembly 10, that is, a surface placed at an upper side in the top insulator 50 and a surface placed at a lower side in the bottom insulator 60.

In addition, if a coating layer 70 is formed on only one of the top insulator 50 and the bottom insulator 60, in general, it is preferable that the coating layer 70 is formed on the surface of the top insulator 50 rather than the bottom insulator 60 in consideration that the positive electrode of the button-type secondary battery is mounted to be disposed at the upper side and that there is a possibility of being damaged by an object falling from the upper side.

In addition, a specific portion of the top insulator 50 or the bottom insulator 60 may be coated to have a thicker protective layer than other portions. For example, the protective layer may be formed to be thicker than other portions at a portion at which possibility of short circuit due to an external impact is relatively high (for example, in the vicinity of the positive and negative electrode tabs), thereby more reducing the possibility of the short circuit at the point.

The protective layer 70 includes inorganic particles that impart heat resistance to the protective layer 70. More specifically, the protective layer is prepared by mixing inorganic particles and a binder polymer.

Here, the inorganic particles are provided in a nano-scale (nano unit size). More specifically, a mixture of inorganic particles and a binder polymer, which is disclosed in Patent Registration No. 10-0775310, may be used as a coating layer applied on a base material of a separator.

The coating layer 70 does not cause the thermal shrinkage of the top insulator 50 and the bottom insulator 60 at a high temperature (for example, a temperature in the range of 120° C. to 140° C.) due to the heat resistance of the inorganic particles.

Figure 5:
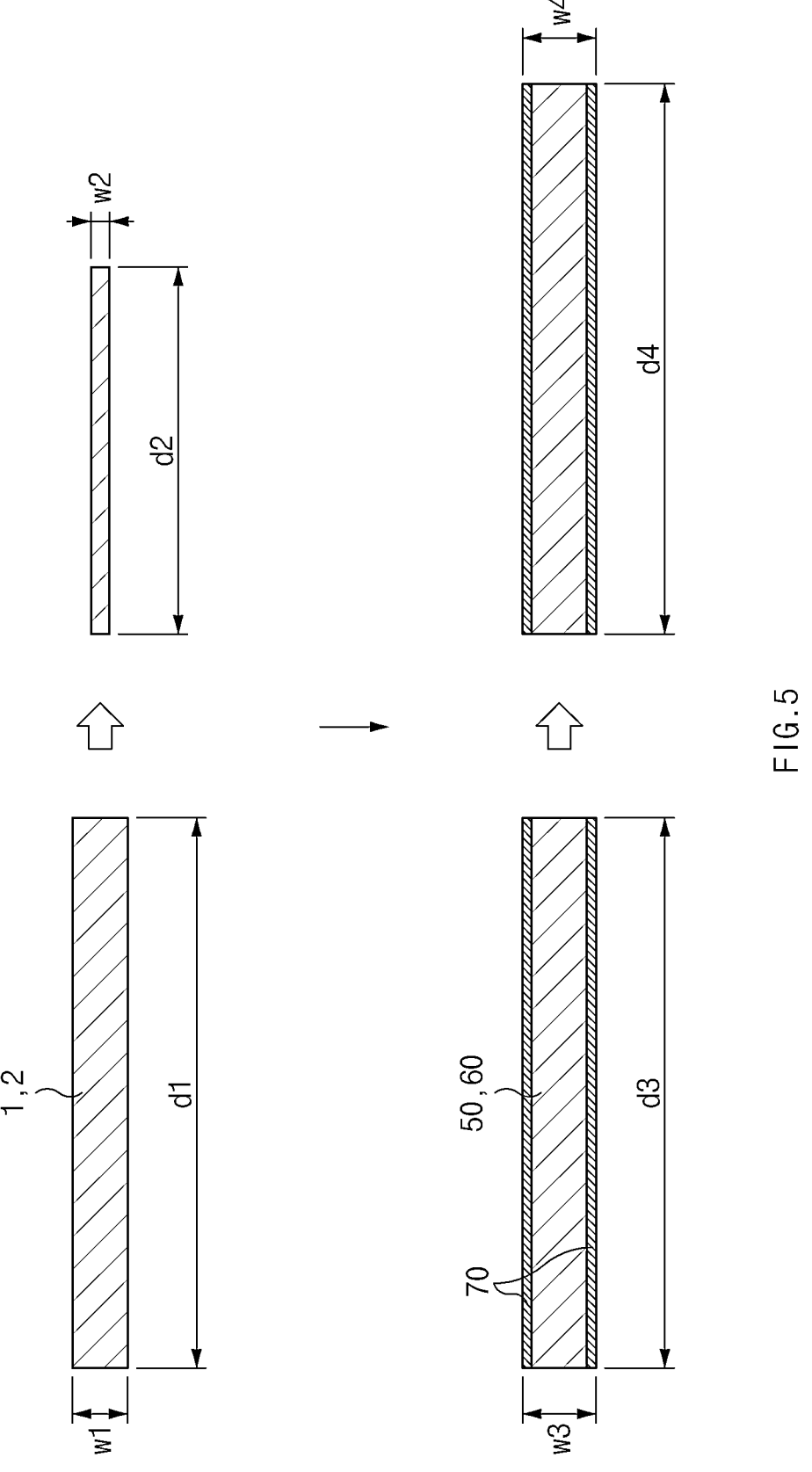
FIG. 5 is a view illustrating before and after states (upper drawing) when heat is applied to top and bottom insulators, which are not coated with a protective layer, according to the related art, and before and after states (lower drawing) when heat is applied to the top and bottom insulators, which are coated with the protective layer, according to the present invention.
Figure 6:
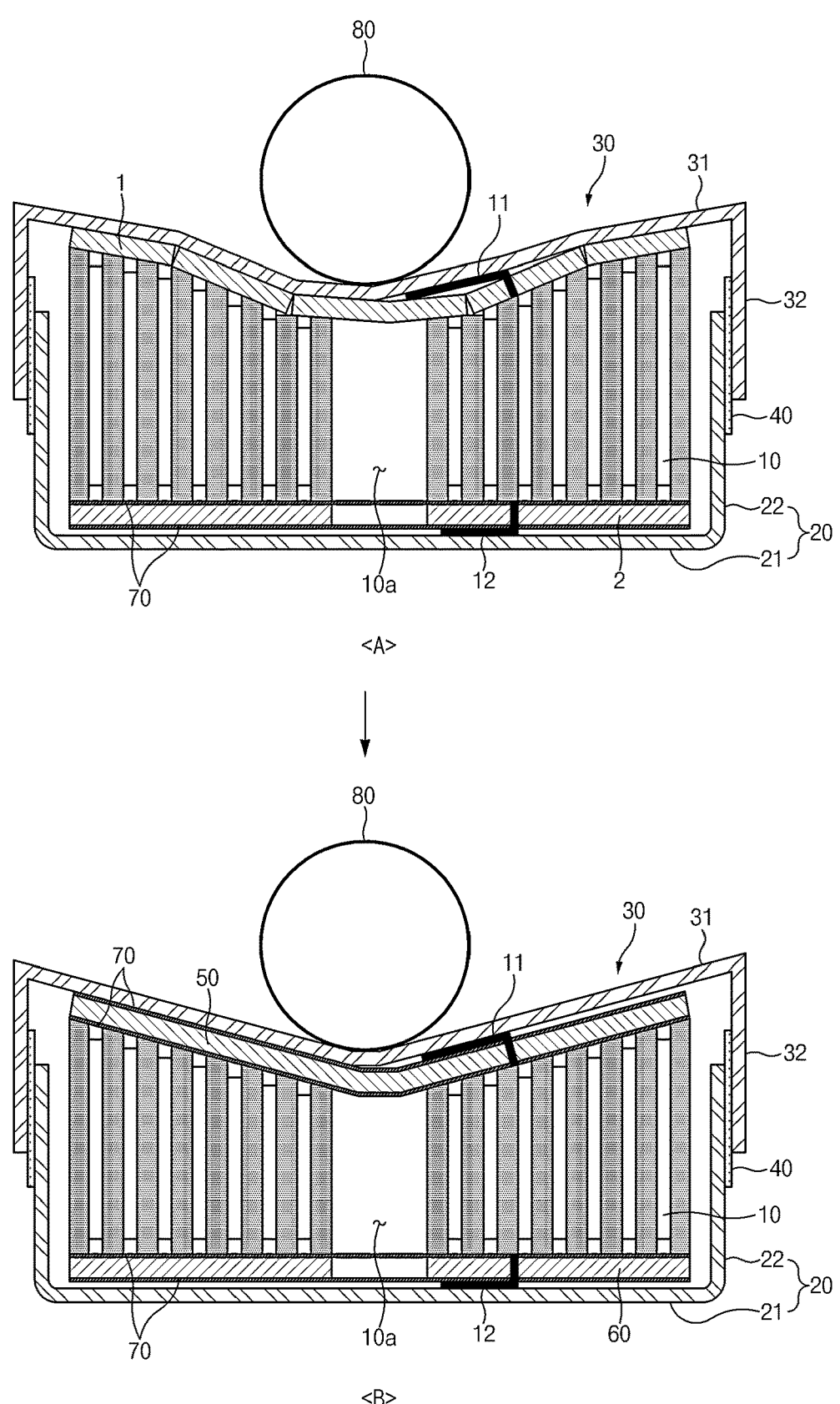
FIG. 6 is a view illustrating a state (upper drawing: A) in which the top insulator, which is not coated with the protective layer, is deformed, and a state (lower drawing: B) in which the top insulator, which is coated with the protective layer, is deformed when an impact bar 80 hits the upper can during an impact test.

FIG. 5 is a view illustrating before and after states (upper drawing) when heat is applied to the top and bottom insulators 1 and 2, which are not coated with the protective layer 70, according to the related art, and before and after states (lower drawing) when heat is applied to the top and bottom insulators 50 and 60, which are coated with the protective layer 70, according to the present invention, and FIG. 6 is a view illustrating a state (upper drawing: A) in which the top insulator 1, which is not coated with the protective layer 70, is deformed, and a state (lower drawing: B) in which the top insulator 50, which is coated with the protective layer 70, is deformed when an impact bar 80 hits the upper can during an impact test.

That is, a swelling tape used in the fields of secondary batteries may be used for the bottom insulator 60 and the top insulator 50 so that the bottom insulator 60 and the top insulator 50 have electrical insulating properties and simultaneously absorb the electrolyte so as to be expanded.

However, as illustrated in FIG. 5, the bottom insulator 60 and the top insulator 50 provided as the swelling tape undergo thermal shrinkage together with vaporization of the absorbed electrolyte when high-temperature heat is applied.

Thus, when heat is applied to the bottom insulator 2 and top insulator 1 according to the related art without the protective layer 70, a thickness is reduced (w1→w2), and a length is also reduced (d1→d2).

On the other hand, the bottom insulator 60 and the top insulator 50 according to the present invention, which are coated with the protective layer 70 on their surfaces may be maintained at the same thickness and length even when the heat is applied (w3=w4, d3=d4).

Therefore, as illustrated in FIG. 6, during the impact test, when the impact bar 80 hits a center of the top surface 31 of the upper can 30, and thus, a crushed portion of the upper can 30 is in contact with the negative electrode of the electrode assembly 10, heat is generated due to short circuit (occurring by contact between the positive electrode and the negative electrode).

Here, in the case <A> in which the protective layer 70 is not coated on the top insulator 50, the top insulator 1 is shrunk due to the heat generated by the short circuit, and a contact area between the positive electrode and a top plate 30 or a contact area between the negative electrode and a positive electrode terminal 40 increases by a degree of shrinkage of the top insulator.

Therefore, since a size of the short circuit gradually increases as an area of the short circuit increases in the situation, in which only little heat is generated due to initial minute short circuit so that the short circuit is terminated, as the size of the short circuit gradually increases (as the short circuit current increases), a risk of fire or explosion increases.

On the other hand, in the case <B> in which the protective layer 70 is applied on the top insulator 70, the top insulator 50 may be maintained in its original area due to the heat generated by the short circuit. Therefore, the short-circuit state is maintained with the size of the initial minute short-circuit caused by the hitting of the impact bar 80, and then, the current is cut off to terminate the situation (that is, since the short-circuit current does not increase, but gradually decreases, an amount of generated heat also gradually decreases so as not to lead to the fire or explosion).

That is, when the protective layer 70 is coated on the top insulator 50 and the bottom insulator 60 as in the present invention, even if the short circuit occurs from the impact applied from the upper and lower sides of the secondary battery, since the fire or explosion does not occur to terminate the situation, stability may be more improved.

According to the present invention having the above-described technical characteristics, since the bottom insulator 60 and the top insulator 50 are expanded to fill the space inside the lower can, the external impact transmitted to the electrode assembly 10 may be buffered and vibration is buffered, and the effect due to the vibration may be reduced.

In addition, since the effect of increasing in thickness of the bottom insulator 60 and the top insulator 50 is expected by applying the protective layer 70, not only the possibility of occurrence of the short circuit may be further reduced, but even if the short circuit occurs, only the minimal short-circuit current may be generated.

Therefore, the electrode assembly 10 may be prevented from being damaged, and the durability of the secondary battery may be further improved.

In addition, the degree of deformation of the upper can 30 and the lower can 20 may be reduced.

Since the bottom insulator 60 and the top insulator 50 are expanded in the state of being seated on the electrode assembly 10 to fill the empty space, there may be no need to increase in height of the lower can 20, preventing the volume from unnecessarily increasing.

Furthermore, the present invention may additionally provide the secondary battery module in which the plurality of button-type secondary batteries having the above characteristics are electrically connected to each other.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Electrode assembly
20: Lower can
30: Upper can
40: Gasket
50: Top insulator
60: Bottom insulator
70: Protective layer

The invention claimed is:

1. A button-type secondary battery, comprising:
a lower can including a bottom surface, an upper sidewall extending upward along a circumference of the bottom surface;
an upper can including a top surface, a lower sidewall extending downward along a circumference of the top surface, the upper can and the lower can being coupled to define a space therein and so that the upper sidewall is disposed inside the lower sidewall;
an electrolyte in the space;
an electrode assembly in the space and including a negative electrode, a separator, and a positive electrode wound together, the electrode assembly further including a negative electrode tab extending downward, and a positive electrode tab extending upward;
a gasket disposed between the upper can and the lower can to electrically insulate the upper and lower cans;
a top insulator that is electrically insulating and covering a top surface of the electrode assembly, the top insulator being configured to expand in volume by absorbing the electrolyte; and
a bottom insulator that is electrically insulating and covering a bottom surface of the electrode assembly, the bottom insulator being configured to expand in volume by absorbing the electrolyte,
wherein surfaces of at least one or more of the top insulator and the bottom insulator are coated with a protective layer configured to prevent thermal shrinkage from occurring.

2. The button-type secondary battery of claim 1, wherein the protective layer is applied to all of a top surface of the top insulator that faces the upper can, and all of a bottom surface of the bottom insulator that faces the lower can.

3. The button-type secondary battery of claim 2, wherein the protective layer is additionally applied to a surface opposite to the top surface of the top insulator, and a surface opposite to the bottom surface of the bottom insulator.

4. The button-type secondary battery of claim 1, wherein the top insulator covers an entire top surface of the electrode assembly, and
wherein the bottom insulator has a plate shape having a size to cover an entire bottom surface of the electrode assembly.

5. The button-type secondary battery of claim 1, wherein the protective layer comprises inorganic particles configured to provide heat resistance to the protective layer.

6. The button-type secondary battery of claim 5, wherein the protective layer includes the inorganic particles mixed with a binder polymer that provides bonding force to adhere to the surface of the top insulator or the bottom insulator.

7. The button-type secondary battery of claim 1, wherein, when the top insulator and the bottom insulator absorb the electrolyte so as to be expanded, each of the top insulator and the bottom insulator is expanded to elastically press the electrode assembly vertically downward from an upper side.

8. The button-type secondary battery of claim 7, wherein one of the top insulator and the bottom insulator is vertically expanded more than the other one of the top insulator and the bottom insulator.

9. The button-type secondary battery of claim 2, wherein a specific portion of the top insulator or the bottom insulator is coated with the protective layer to have a thickness greater than that of other portions.

10. A secondary battery module, comprising a plurality of button type secondary batteries according to claim 1 electrically connected to each other.

* * * * *